(12) United States Patent
Vanderberg et al.

(10) Patent No.: US 7,059,586 B2
(45) Date of Patent: Jun. 13, 2006

(54) KNIFE GATE VALVE HAVING ELASTOMERIC GATE AND CHEST SEALS

(75) Inventors: Christopher Allen Vanderberg, Amory, MS (US); Shaine Gordon Reeves, Southhaven, MS (US); John Paul Comstock, Amory, MS (US); Timothy Carl Sumrall, Greenwood Springs, MS (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 41 days.

(21) Appl. No.: 10/816,520

(22) Filed: Apr. 1, 2004

(65) Prior Publication Data

US 2005/0218368 A1   Oct. 6, 2005

(51) Int. Cl.
*F16K 3/00* (2006.01)
(52) U.S. Cl. .................... 251/328; 251/214; 277/646
(58) Field of Classification Search ............... 251/214, 251/327, 328, 329; 277/637, 641, 644, 645, 277/646
See application file for complete search history.

(56) References Cited

U.S. PATENT DOCUMENTS

| | | | |
|---|---|---|---|
| 3,154,287 A * | 10/1964 | Clandinin | ............... 251/214 |
| 3,917,223 A | 11/1975 | Sidler et al. | |
| 4,009,727 A | 3/1977 | Bailey | |
| 4,026,517 A | 5/1977 | Still | |
| RE29,679 E | 6/1978 | Boitnott | |
| 4,206,905 A * | 6/1980 | Dobler | ............... 251/328 |
| 4,230,299 A | 10/1980 | Pierce, Jr. | |
| 4,364,542 A | 12/1982 | Meyer | |
| 4,429,710 A | 2/1984 | Grieves et al. | |
| 4,451,047 A | 5/1984 | Herd et al. | |
| 4,516,752 A | 5/1985 | Babbitt et al. | |
| 4,552,369 A | 11/1985 | Stewart et al. | |
| 4,583,569 A | 4/1986 | Ahlstone | |
| 4,603,864 A | 8/1986 | Raftis | |
| 4,646,407 A | 3/1987 | Mayhew, Jr. | |
| 4,679,770 A | 7/1987 | Liberman | |
| 4,703,915 A | 11/1987 | King | |
| 4,765,361 A | 8/1988 | Clifford | |

(Continued)

FOREIGN PATENT DOCUMENTS

DE      25 06 140 A1    8/1976

(Continued)

OTHER PUBLICATIONS

Comstock, Jr., et al.; U.S. Provisional Patent Application titled Dry Powder Retention Knife Gate Valve, U.S. Appl. No. 60/449,996, filed Feb. 26, 2003.

(Continued)

*Primary Examiner*—Edward K. Look
*Assistant Examiner*—John K. Fristoe, Jr.
(74) *Attorney, Agent, or Firm*—RatnerPrestia

(57) ABSTRACT

A gate seal for a knife gate valve comprising a sealing surface lining the gate channel and an integral gasket for compression between valve body halves, a chest seal for a knife gate valve comprising a body having an expandable sealing surface and one or more injection chambers adapted to receive an injectable packing, each chamber having a cross-sectional area that is completely surrounded by the body member, and/or a knife gate valve comprising one or both such seals. The chest seal body may comprise a knife gate slot that is peripherally surrounded by the body. The gate seal and the chest seal may comprise a single integral elastomeric member or separate components.

33 Claims, 3 Drawing Sheets

U.S. PATENT DOCUMENTS

| | | | |
|---|---|---|---|
| 4,881,719 A | 11/1989 | Bowman | |
| 4,895,181 A | 1/1990 | McKavanagh | |
| 5,056,758 A | 10/1991 | Bramblet | |
| 5,062,439 A | 11/1991 | Butler et al. | |
| 5,082,247 A | 1/1992 | Owens et al. | |
| 5,137,261 A | 8/1992 | Clifford | |
| 5,178,180 A | 1/1993 | Parris et al. | |
| 5,197,512 A | 3/1993 | Lev | |
| 5,205,317 A | 4/1993 | Neuerberg et al. | |
| 5,244,183 A | 9/1993 | Calvin et al. | |
| 5,271,426 A | 12/1993 | Clarkson et al. | |
| 5,295,661 A | 3/1994 | Roussel | |
| 5,338,006 A | 8/1994 | McCutcheon et al. | |
| RE35,116 E | 12/1995 | Butler et al. | |
| 5,653,423 A | 8/1997 | Young et al. | |
| 5,890,700 A | 4/1999 | Clarkson et al. | |
| 5,908,044 A | 6/1999 | Kearns et al. | |
| 5,908,046 A * | 6/1999 | Mosman | 137/312 |
| 5,979,874 A | 11/1999 | Gambetta et al. | |
| 6,116,573 A | 9/2000 | Cornette et al. | |
| 6,279,875 B1 | 8/2001 | Chatufale | |
| 6,375,157 B1 * | 4/2002 | Van de Lande | 251/327 |
| 6,422,535 B1 | 7/2002 | Stone et al. | |
| 6,588,729 B1 | 7/2003 | Kimpel | |

FOREIGN PATENT DOCUMENTS

| | | |
|---|---|---|
| GB | 2 340 916 A | 3/2000 |
| WO | WO 93/00536 A | 1/1993 |

OTHER PUBLICATIONS

Reeves, Shaine and Vanderberg, Christopher A; titled Knife Gate Valve, U.S. Appl. No. 10/425,226, filed Apr. 29, 2003.

* cited by examiner

KNIFE GATE VALVE HAVING ELASTOMERIC GATE AND CHEST SEALS

FIELD OF THE INVENTION

This invention relates to valves, more particularly knife gate valves.

BACKGROUND OF THE INVENTION

Knife gate valves are well known in the art for use in a variety of applications in a broad range of industries, including but not limited to, pulp & paper, chemical, petroleum refining, mining, iron and steel manufacture, waste water, power generation, food and beverage, and marine applications. In particular, knife gate valves are advantageous for use in non-abrasive and abrasive slurry applications and for large diameter water applications. The use of elastomeric valve seats are known to be particularly helpful for applications having high solids or prone to scaling.

One advantage of knife gate valves is the ability to cut through slurries, scale, and surface build ups. Another advantage is the unobstructed flow path, which not only provides high flow capacity, but also allows large objects to safely pass through the valve. Small face-to-face dimensions reduce the weight of the valve and facilitate piping design. Knife gate valves are typically available in sizes as small as 2" diameter to specially fabricated valves exceeding 100" in diameter.

Disadvantages of knife gate valves historically have been a general inability to provide a tight shut off and the presence of cavities within the valve that promote contamination of the fluid stream. The use of elastomeric gate seals has increased the ability of knife gate valves to provide a tighter shut off, but other concerns remain. U.S. Pat. Ser. No. 10/425,226, incorporated herein by reference, filed Apr. 29, 2003 by the common assignee of the present application and listing common co-inventors Vanderberg and Reeves, discloses a lateral seal for use in the stuffing box of the chest seal of a knife gate valve, wherein the lateral seal is adapted to receive an injectable packing material to improve the sealing relationship.

While this design improves the sealing relationship, this design allows the injectable packing material used in the lateral seal to mix with the fluid media, which can be disadvantageous in some applications. Accordingly, improving the seal structures of knife gate valves is a continued goal of valve manufacturers.

SUMMARY OF THE INVENTION

One aspect of the invention comprises a knife gate valve with an improved gate seal and chest seal. The valve body comprises mating halves that in an assembled configuration define a flow channel extending through the body and a gate channel through which a knife gate is adapted to slide between an open position that allows flow within the flow channel and a closed position that blocks flow within the flow channel. The mating body halves also define a gate seal chamber in which the gate seal is mounted and a chest seal chamber in which the chest seal is mounted. The gate seal comprises a sealing surface lining the gate channel for creating a perimeter seal with the knife gate and an integral gasket extending from the gate seal in a direction opposite the sealing surface for compression between the body halves. The chest seal comprises a body member having a peripherally enclosed knife gate slot for receiving the knife gate, expandable sealing surfaces on upstream and downstream sides of the knife gate slot, and one or more injection chambers adapted to receive an injectable packing. Each chamber has a cross-sectional area that is completely surrounded by the body member. The gate seal and the chest seal may comprise a single integral elastomeric member or separate components. One or more scrapers may be positioned above or below the chest seal. Preferably a set of four scrapers may comprise one scraper positioned upstream and downstream of the knife gate slot both above and below the chest seal.

Another aspect of the invention comprises a knife gate valve as described above having a gate seal as described above, without limitation to the chest seal described above. Still another aspect of the invention comprises a gate seal for mounting in a gate seal chamber defined by mating valve body halves of a knife gate valve, the knife gate valve comprising a flow channel and a knife gate slidable between an open position and a closed position in a gate channel. The gate seal comprises a sealing surface lining the gate channel for creating a seal with the knife gate in the closed position, and an integral gasket extending from the gate seal in a direction opposite the flow channel for serving as a gasket between the body halves.

Yet another aspect of the invention comprises a knife gate valve having a valve body comprising a flow channel extending through the body; a knife gate adapted to slide within a gate channel between an open position and a closed position; and a chest seal mounted in a chest seal chamber. The chest seal comprises at least one body member having an expandable sealing surface for creating a seal with the knife gate and at least one injection chamber adapted to receive an injectable packing, the injection chamber having a cross-sectional area that is completely surrounded by the chest seal body member. The chest seal may comprise a sealing surface for contact with at least one of an upstream or a downstream side of the knife gate, including wherein the body member perpherally surrounds a knife gate slot for receiving the knife gate and comprises expandable sealing surfaces on both the upstream and the downstream side of the knife gate.

Still another aspect of the invention comprises a chest seal for mounting in a chest seal chamber of a knife gate valve, the knife gate valve comprising a flow channel and a knife gate slidable between an open position and a closed position, the chest seal comprising at least one body member having an expandable sealing surface for creating a seal with the knife gate and at least one injection chamber adapted to receive an injectable packing, the injection chamber having a cross-sectional area that is completely surrounded by the chest seal body member.

DETAILED DESCRIPTION OF THE INVENTION

Figure 2:
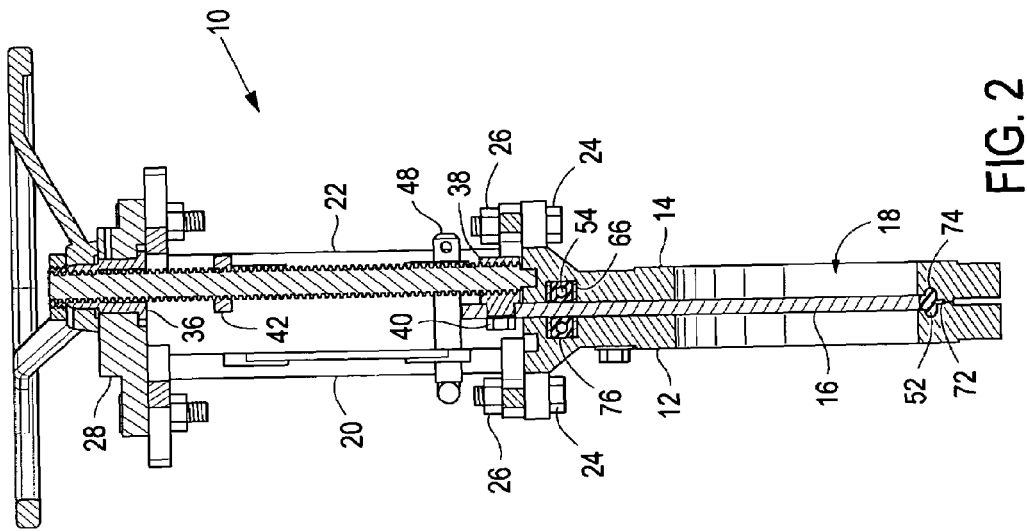
FIG. 2 is a cross-sectional view of the valve of FIG. 1, taken across line 2—2.
Figure 1:
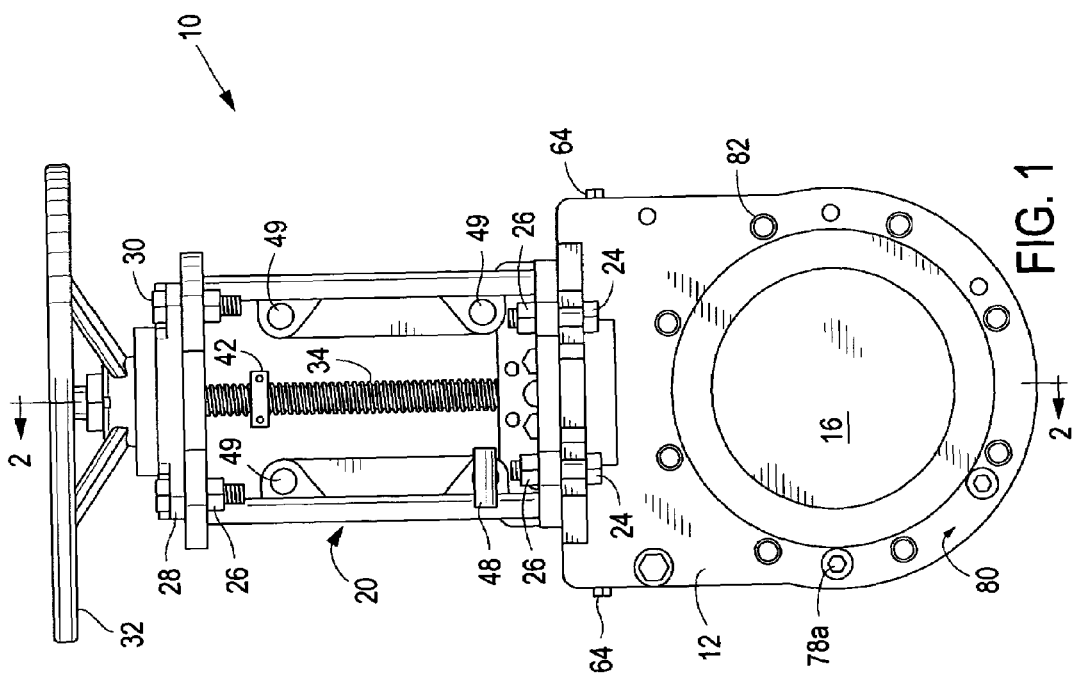
FIG. 1 is a plan view of an exemplary valve embodiment of the present invention.
Figure 3:
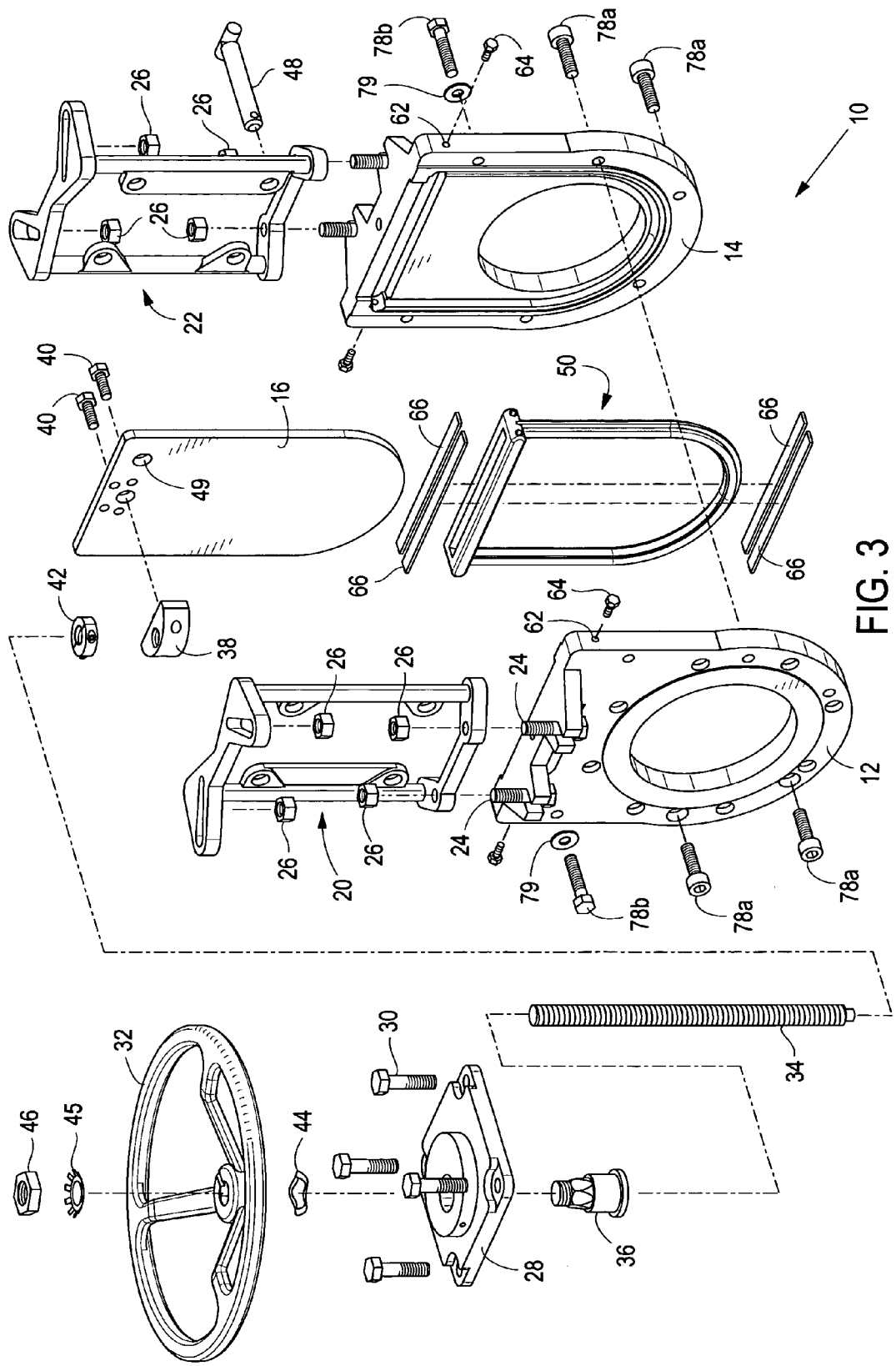
FIG. 3 is an exploded perspective view of the valve of FIG. 1.

The invention will next be described with respect to the figures. FIGS. 1–3 depict an exemplary knife gate valve embodiment 10 of the present invention. Valve 10 comprises two body halves 12 and 14 that define a gate channel through which gate 16 slides to open or close pathway 18 through the valve. Mounted on top of the body halves 12 and 14 are yoke halves 20 and 22. The body halves are typically connected to the yoke halves with yoke hold down bolts 24 and fasteners 26. A yoke hub 28, connected to the yoke halves with hub hold down bolts 30 and fasteners 26, sits atop the yoke halves and provides a platform for handwheel 32. The invention is not limited to handwheel actuators, however, as removal of the hub allows the use of other types of actuators, such as but not limited to pneumatic, hydraulic, electric or bevel gear actuators.

Handwheel 32 turns drive nut assembly 36, which turns the threaded stem 34. Wave spring 44, retaining washer 45, and retaining nut 46 fix the drive nut assembly 36 to the handwheel 32. At the end of stem 34 is stemnut 38 which is attached to gate 16 with stemnut bolts 40. As the threaded stem 34 turns the stemnut 38 either travels up or down along the axis of the stem 34. Travel stop 42 limits the upward travel of stemnut 38. A lockout pin 48 is provided for insertion in any of lockout holes 49 in the yoke and/or gate to mechanically prevent the valve from being opened or closed (depending upon the location of the gate when pinned) pursuant to common industry safety procedures. Additional components, not shown or shown but not discussed, may also be present. The above elements are typical features of knife gate valves generally, and are not unique or critical to the present invention. Accordingly, the invention is not limited to valves having any particular components except those specifically recited in the claims.

Figure 5:
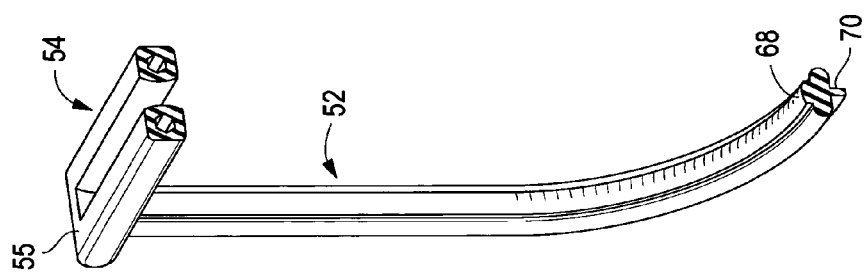
FIG. 5 is a cutaway view of the integral seal of FIG. 4, showing the cross-sectional geometry of both the gate seal and chest seal portions.
Figure 4:
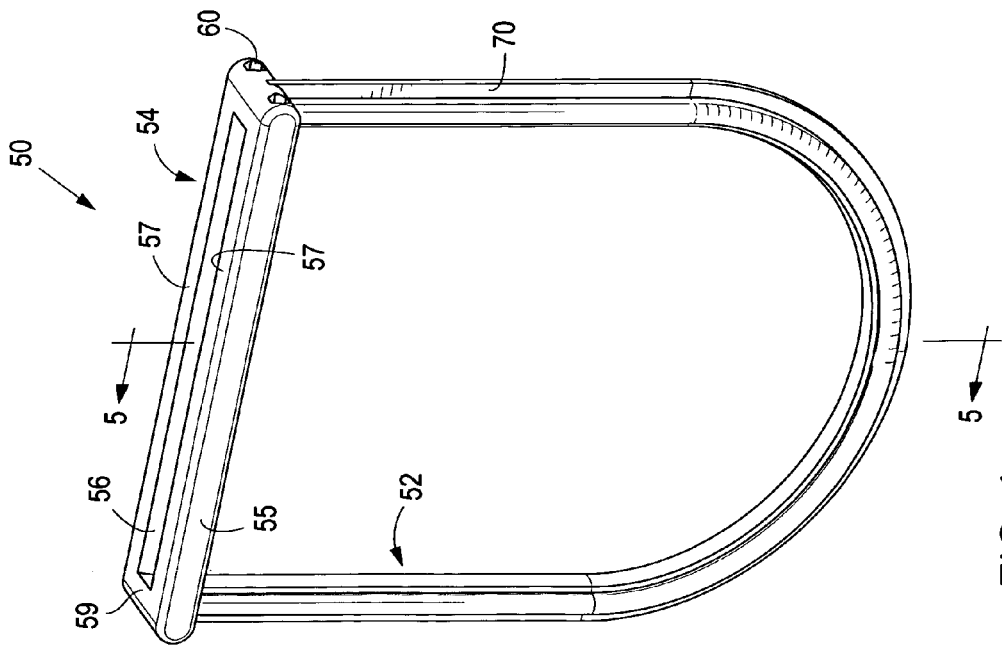
FIG. 4 is a perspective view of an integral gate seal/chest seal embodiment of the present invention.

As shown in FIG. 3 and in more detail in FIGS. 4 and 5, the exemplary knife gate valve 10 of the present invention further comprises an integral gate and chest seal 50. Although shown as an integral unit in FIGS. 3–5, gate seal 52 may be a separate component from chest seal 54. Chest seal 54 shown in FIG. 6 is shown as a standalone unit, but is otherwise similar to the chest seal portion 54 of integral gate and chest seal 50.

Figure 6:
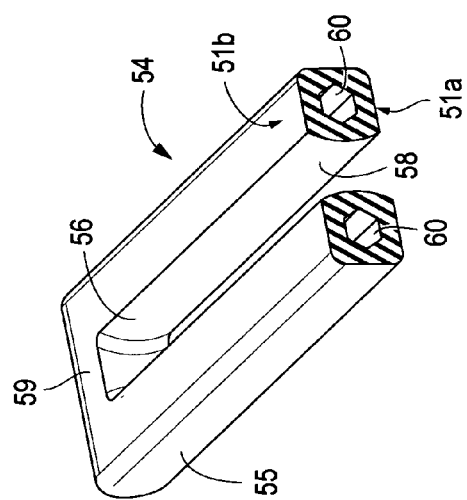
FIG. 6 is a cutaway view of an exemplary chest seal embodiment of the present invention.

Chest seal 54, whether a standalone unit as shown in FIG. 6 or as a portion of an integral chest and gate seal, comprises an elastomeric body member 55 having a knife gate slot 56 for receiving knife gate 16. Expandable sealing surfaces 58 of gate slot 56 have a convex geometry, such as a rounded geometry with a single continuous arc from the lower plane 51a to the upper plane 51b of the chest seal member as shown in FIG. 6. Other convex geometries may also be provided, however, including multiple arcs or ridges. Chest seal 54 has one or more inner channels 60 for receiving injectable packing, preferably one channel on each of the upstream and downstream sides 57 of the knife gate slot. The packing may be injected into the seal through seal injection ports 62 in the body halves 12 and 14 that are aligned with channels 60 when the valve is assembled. Plugs 64, typically bolts that mate with threads in the body halves, close seal injection ports 62 after the packing has been injected. As the plugs 64 are advanced into the injection ports, the injectable packing expands the expandable sealing surfaces 58 of the chest seal and causes expandable sealing surfaces 58 to make a tighter seal with the gate.

Suitable injectable packing comprises any injectable packing materials known in the art. Such materials are typically tacky, fibrous, flowable materials, such as a blend of lubricants and fibers, as is described generally in U.S. Pat. No. 4,162,078, incorporated herein by reference, and as manufactured, for example, by Utex Industries, Inc. of Houston Tex. under the trademark U-PAK®, by O.G. Supply, Inc. of Corona, Calif., under the trademark SEALI-TAL®, or by Deacon Industries of Washington, Pa. One injectable packing particularly well-suited to this application is known in the trade as DEACON™ 5500A. These are merely examples of the numerous such products that are well known in the art, however, and the invention is not limited to the use of any particular type of injectable packing.

Because inner channels 60 are completely contained within the elastomeric body of chest seal 54, the injectable packing cannot leak into the flow stream. Scraper blades 66 positioned above and below the chest seal help to keep gate 16 clean as it is raised and lowered to minimize debris from entering the knife gate slot 56 and potentially interfering with the seal between gate 16 and expandable sealing surfaces 58.

Chest seal 54 as shown in the figures comprises a single elastomeric member 55 that completely surrounds the rectangular knife gate slot, the single member comprising two long side portions 57 and two short side portions 59 connecting the long side portions. In some applications, however, it may be desirable to provide discrete chest seal components in the shape of long side portions 57, with no connection between these individual components. Although such a construction does not have the advantage of completely surrounding the knife gate slot to maximize the overall sealing surface, this embodiment still retains the advantage over the prior art of providing a completely contained injection chamber for receiving the injectable packing, so that the packing does not leak into the fluid stream.

In yet another embodiment, in addition to discrete long side portions 57 on the upstream and downstream sides of the rectangular knife gate, additional discrete short side portions 59 may be provided perpendicular to the upstream and downstream sides to completely line the cross sectional periphery of knife gate 16 in the same way as single member 55 as shown in the figures, but using a plurality of discrete components rather than an integral construction. Thus, unless specifically indicated, references to the chest seal of this invention refers to both the single integral member or to a plurality of discrete members.

Although shown in the figures with injectable packing chambers only on the long side portions 57, additional injectable packing chambers (not shown) may be provided in the short side portions 59, with suitable access ports in the body of the valve to fill the chambers. Thus, short side portions 59, whether discrete components or integral portions of member 55, may be provided with or without injectable packing chambers.

Gate seal 52, whether a portion of integral chest and gate seal 50 or a stand alone component (not shown), comprises a sealing surface 68 that creates a seal with gate 16, and an integral gasket 70 that forms a gasket between body halves 12 and 14. Body halves 12 and 14 are suitably designed to form mating surfaces with a gasket chamber 72 to receive the gasket, a gate seal chamber 74 to retain the gate seal in the desired position, and a chest seal chamber 76 to retain the chest seal 54 and scraper blades 66 in the desired positions.

After positioning the seals and scrapers in the desired locations, body halves 12 and 14 are connected together with body clamping bolts 78a and 78b. As shown in FIG. 3, body clamping bolts 78*a* used on connection face 80—the portion that connects with the mating pipe flanges (not shown) of the pipeline in which the valve is installed—typically have socket heads to enable them to be tightened into recesses in the body so that they do not protrude from the connection face. Body clamping bolts 78*b* not on the connection face where protrusion is not an issue may have cap heads and may further utilize washers 79. It should be noted, however, that the invention is not limited to any particular types of nuts and bolts. Bolt holes 82 in the body are provided for installation of the valve between mating pipe flanges.

The various components of the valve may comprise any materials known in the art. Typically the body, yoke, and other structural components are metallic, such as stainless steel, carbon steel, plated steel, and the like. Certain components, such as the drive nut and stem nut, may be fabricated of bronze. Because precise tolerances are not required for the handwheel, it may be cast iron. The scrapers may comprise a phenolic resin, which provides stiffness and durability for good scraping, will not create wear on the knife gate, and may be inexpensively replaced as needed. The gate seal and chest seal may comprise any elastomeric material, such as a natural or synthetic rubber, including but not limited to materials such as EPDM (Ethylene Propylene Diene Monomer), VITON® fluoroelastomer (produced by E.I. duPont de Nemours and Company, of Wilmington, Del.) or AFLAS® fluoroelastomer (produced the Asahi Glass Company, Inc. of Japan).

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A knife gate valve comprising:
   a valve body comprising mating halves that in an assembled configuration define a flow channel extending through the body,
   a knife gate adapted to slide within a gate channel between the halves of the valve body into an open position that allows flow within the flow channel and a closed position that blocks flow within the flow channel,
   a single gate seal mounted in a gate seal chamber defined by the mating valve body halves, the gate seal having a sealing surface lining the gate channel for creating a seal with a perimeter of the knife gate, and an integral gasket extending from the gate seal in a direction opposite the sealing surface and compressed between the body halves; and
   a chest seal mounted in a chest seal chamber defined by the mating valve body halves, the chest seal comprising a body member having a peripherally enclosed knife gate slot for receiving the knife gate, expandable sealing surfaces on upstream and downstream sides of the knife gate slot for creating a seal with the knife gate, and one or more injection chambers adapted to receive an injectable packing, each chamber having a cross-sectional area that is completely surrounded by the body member.

2. The valve of claim 1, wherein the gate seal and the chest seal comprise a single integral elastomeric member.

3. The valve of claim 1, further comprising one or more scrapers positioned above or below the chest seal.

4. The valve of claim 3, comprising a set of four scrapers positioned one upstream and one downstream of the knife gate slot both above and below the chest seal.

5. The valve of claim 1, wherein the chest seal comprises convex expandable sealing surfaces.

6. The valve of claim 5, wherein the convex expandable sealing surfaces comprise rounded surfaces defining a single arc from a lower plane of the chest seal to an upper plane of the chest seal.

7. The valve of claim 1, wherein the gate seal and the chest seal are separate components.

8. The valve of claim 1, wherein the gate seal and the chest seal each comprise an elastomeric material.

9. The valve of claim 8, wherein the elastomeric material comprises EPDM or a fluoroelastomer.

10. A knife gate valve comprising:
    a valve body comprising mating halves that in an assembled configuration define a flow channel extending through the body,
    a knife gate adapted to slide within a gate channel between the halves of the valve body into an open position that allows flow within the flow channel and a closed position that blocks flow within the flow channel, and
    a single gate seal mounted in a gate seal chamber defined by the mating valve body halves, the gate seal having a sealing surface lining a perimeter of the gate channel for creating a seal with a perimeter of the knife gate, and an integral gasket extending from the gate seal in a direction opposite the sealing surface and compressed between the body halves.

11. The valve of claim 10, wherein the gate seal comprises an elastomeric material.

12. The valve of claim 11, wherein the elastomeric material comprises EPDM or a fluoroelastomer.

13. The knife gate valve of claim 10, further comprising a chest seal mounted in a chest seal chamber defined by the mating valve body halves, the chest seal comprising a body member having a peripherally enclosed knife gate slot for receiving the knife gate, expandable sealing surfaces on upstream and downstream sides of the knife gate slot for creating a seal with the knife gate, and one or more injection chambers adapted to receive an injectable packing, each chamber having a cross-sectional area that is completely surrounded by the body member.

14. A single gate seal for mounting in a gate seal chamber defined by mating valve body halves of a knife gate valve, the knife gate valve comprising a flow channel and a knife gate slidable in a gate channel between an open position that allows flow within the flow channel and a closed position that blocks flow within the flow channel, the single gate seal having a sealing surface lining a perimeter of the gate channel for creating a seal with a perimeter of the knife gate in the closed position, and an integral gasket extending from the gate seal in a direction opposite the sealing surface and compressed between the body halves.

15. The gate seal of claim 14, further comprising a chest seal mounted in a chest seal chamber defined by the mating valve body halves, the chest seal comprising a body member having a peripherally enclosed knife gate slot for receiving the knife gate, expandable sealing surfaces on upstream and downstream sides of the knife gate slot for creating a seal with the knife gate, and one or more injection chambers adapted to receive an injectable packing, each chamber having a cross-sectional area that is completely surrounded by the body member.

16. A knife gate valve comprising:
- a valve body comprising a flow channel extending through the body,
- a knife gate adapted to slide within a channel into an open position that allows flow within the flow channel and a closed position that blocks flow within the flow channel, and
- a single chest seal mounted in a chest seal chamber, the chest seal comprising at least one body member having an expandable sealing surface for creating a seal with a perimeter of the knife gate and at least one injection chamber adapted to receive an injectable packing, the chamber having a cross-sectional area that is completely surrounded by the body member.

17. The valve of claim 16, wherein the chest seal comprises an expandable sealing surface for contact with at least one of an upstream or a downstream side of the knife gate.

18. The valve of claim 17, wherein the chest seal peripherally surrounds a knife gate slot for receiving the knife gate and comprises an expandable sealing surfaces on both the upstream and the downstream side of the knife gate.

19. The valve of claim 18, wherein the chest seal comprises a single integral body member that peripherally surrounds the knife gate slot.

20. The valve of claim 16, wherein the expandable sealing surface of the chest seal is convex.

21. The valve of claim 20, wherein the convex expandable sealing surface comprises a rounded surface defining a single arc from a lower plane of the chest seal to an upper plane of the chest seal.

22. The valve of claim 16, wherein the chest seal comprises an elastomeric material.

23. The valve of claim 22, wherein the elastomeric material comprises EPDM or a fluoroelastomer.

24. The valve of claim 16 further comprising one or more scrapers positioned above or below the chest seal.

25. The valve of claim 24 comprising one scraper positioned above the chest seal and one scraper positioned below the chest seal.

26. The valve of claim 25 comprising a set of four scrapers positioned one upstream and one downstream of the knife gate slot both above and below the chest seal.

27. A chest seal for mounting in a chest seal chamber of a knife gate valve, the knife gate valve comprising a flow channel and a knife gate slidable between an open position that allows flow within the flow channel and a closed position that blocks flow within the flow channel, wherein the chest seal peripherally surrounds a knife gate slot for receiving a perimeter of the knife gate, the chest seal comprising at least one body member having an expandable sealing surface for creating a seal with the knife gate and at least one injection chamber adapted to receive an injectable packing, the chamber having a cross-sectional area that is completely surrounded by the body member.

28. The chest seal of claim 27, wherein the chest seal comprises expandable sealing surfaces on both an upstream side and a downstream side of the knife gate.

29. The chest seal of claim 28 comprising a single integral body member that peripherally surrounds the knife gate slot.

30. The chest seal of claim 27, wherein the expandable sealing surface of the chest seal is convex.

31. The chest seal of claim 30, wherein the convex expandable sealing surface comprises a rounded surface defining a single arc from a lower plane of the chest seal to an upper plane of the chest seal.

32. The chest seal of claim 27, wherein the chest seal comprises an elastomeric material.

33. The chest seal of claim 32, wherein the elastomeric material comprises EPDM or a fluoroelastomer.

* * * * *